US008510103B2

(12) United States Patent
Angott

(10) Patent No.: US 8,510,103 B2
(45) Date of Patent: Aug. 13, 2013

(54) SYSTEM AND METHOD FOR VOICE RECOGNITION

(76) Inventor: Paul Angott, Bloomfield Hills, MI (US)

( * ) Notice: Subject to any disclaimer, the term of this patent is extended or adjusted under 35 U.S.C. 154(b) by 252 days.

(21) Appl. No.: 12/905,703

(22) Filed: Oct. 15, 2010

(65) Prior Publication Data

US 2011/0093261 A1 Apr. 21, 2011

Related U.S. Application Data

(60) Provisional application No. 61/251,979, filed on Oct. 15, 2009.

(51) Int. Cl.
*G10L 19/14* (2006.01)
*G10L 15/22* (2006.01)
*G10L 17/00* (2006.01)

(52) U.S. Cl.
USPC .......................... 704/205; 704/275; 704/246

(58) Field of Classification Search
USPC ........................................................ 704/205
See application file for complete search history.

(56) References Cited

U.S. PATENT DOCUMENTS

| | | | | |
|---|---|---|---|---|
| 4,469,038 A * | 9/1984 | Fujikawa | ................. | 112/470.01 |
| 4,827,519 A * | 5/1989 | Fujimoto et al. | .............. | 704/250 |
| 5,675,639 A * | 10/1997 | Itani | ................................ | 379/351 |
| 5,787,230 A * | 7/1998 | Lee | ................................ | 704/235 |
| 5,832,428 A * | 11/1998 | Chow et al. | .................... | 704/254 |
| 6,421,453 B1 * | 7/2002 | Kanevsky et al. | ............. | 382/115 |
| 6,477,500 B2 * | 11/2002 | Maes | ............................. | 704/275 |
| 6,940,951 B2 * | 9/2005 | Mahoney | .................... | 379/88.03 |
| 6,961,703 B1 * | 11/2005 | Higgins et al. | ................ | 704/249 |
| 7,136,815 B2 * | 11/2006 | Garudadri | ..................... | 704/255 |
| 7,203,652 B1 * | 4/2007 | Heck | .............................. | 704/273 |
| 7,548,861 B2 * | 6/2009 | Nada | .............................. | 704/270 |
| 7,684,987 B2 * | 3/2010 | Chu et al. | ....................... | 704/254 |
| 8,190,420 B2 * | 5/2012 | Kadirkamanathan et al. | .... | 704/8 |
| 8,190,538 B2 * | 5/2012 | Zhang et al. | .................... | 706/12 |
| 2011/0093261 A1 * | 4/2011 | Angott | ........................... | 704/205 |

\* cited by examiner

*Primary Examiner* — David R Hudspeth
*Assistant Examiner* — Timothy Nguyen
(74) *Attorney, Agent, or Firm* — Young, Basile, Hanlon & MacFarlane, P.C.

(57) ABSTRACT

Systems and methods are operable to associate each of a plurality of stored audio patterns with at least one of a plurality of digital tokens, identify a user based on user identification input, access a plurality of stored audio patterns associated with a user based on the user identification input, receive from a user at least one audio input from a custom language made up of custom language elements wherein the elements include at least one monosyllabic representation of a number, letter or word, select one of the plurality of stored audio patterns associated with the identified user, in the case that the audio input received from the identified user corresponds with one of the plurality of stored audio patterns, determine the digital token associated with the selected one of the plurality of stored audio patterns, and generate the output signal for use in a device based on the determined digital token.

20 Claims, 9 Drawing Sheets

FIG. 1

| | Audio Pattern | Custom Language Pronunciation | User | Opening Command | Closing Command | Digital Token |
|---|---|---|---|---|---|---|
| 101a | A | [ey] | U1 | no | | Display "A" command |
| | B | [bee] | U1 | no | | Display "B" command |
| | C | [see] | U1 | no | | Display "C" command |
| | W | [duhb] | U1 | no | | Display "W" command |
| | 7 | [sev] | U1 | no | | Display "7" command |
| | Text | [tekst] | U1 | Yes | Yes | Display "ready" command; transmit command |
| | Find | [fahynd] | U1 | Yes | Yes | Display "ready" command; access memory command |
| | . | . | . | . | . | . |
| | . | . | . | . | . | . |
| 101b | A | [ey] | U2 | no | no | Display "A" command |
| | B | [bee] | U2 | no | no | Display "B" command |
| | C | [see] | U2 | no | no | Display "C" command |
| | . | . | . | . | . | . |
| | . | . | . | . | . | . |
| 101c | A | [ey] | U8 | no | no | Display "A" command |

SYSTEM AND METHOD FOR VOICE RECOGNITION

CROSS-REFERENCE TO RELATED APPLICATION

This application claims priority from U.S. Provisional Application Ser. No. 61/251,979 filed Oct. 15, 2009, which is incorporated herein in its entirety by reference.

TECHNICAL FIELD

The present invention relates to voice recognition technology.

BACKGROUND

Voice recognition technology attempts to receive and decode spoken words. Accordingly, voice recognition technology in some cases compensates for variations in speech between individual users and distinguish separate words, phrases and sounds from a continuous stream of audio input. Due to the complexity required to distinguish between a vast numbers of various words in a given language and further distinguish between the various accents, pitches and frequencies of individual users within that selection of words in a given language the algorithms, processing and memory required can lead to an undesirable level of mistakes, expense, processing time and training time.

Speaker independent voice recognition devices, for example, can require an immense recognition dictionary containing tens to hundreds of thousands of words and their respective phoneme representations. Such devices can also model the probability that certain words will be positioned at the beginning or end of sentences, the probability there is an association between various words, as well as algorithms for modifying word relationships or other logic based language relationships. These features can be prohibitively expensive in a low cost device or portable device with various inherent limitations in battery, processing capability, memory space and cost.

BRIEF SUMMARY

Accordingly, a voice recognition system that accounts for variability of voice characteristics while keeping cost, memory usage, processing time, and system training time as low as possible is desired. Such a system and method is also desirable in a portable, mobile or hand held device due in part to inherent limitations in processing, memory and battery.

According to some embodiments, systems and methods are operable to associate each of a plurality of stored audio patterns with at least one of a plurality of digital tokens, identify a user based on user identification input, access a plurality of stored audio patterns associated with a user based on the user identification input, receive from a user at least one audio input from a custom language made up of custom language elements wherein the elements include at least one monosyllabic representation of a number, letter or word, select one of the plurality of stored audio patterns associated with the identified user, in the case that the audio input received from the identified user corresponds with one of the plurality of stored audio patterns, determine the digital token associated with the selected one of the plurality of stored audio patterns, and generate the output signal based on the determined digital token.

BRIEF DESCRIPTION OF THE DRAWINGS

The description herein makes reference to the accompanying drawings wherein like reference numerals refer to like parts throughout the several views, and wherein:

FIG. 1 is a schematic diagram of a table of audio patterns and digital tokens.

DETAILED DESCRIPTION

Figure 2:
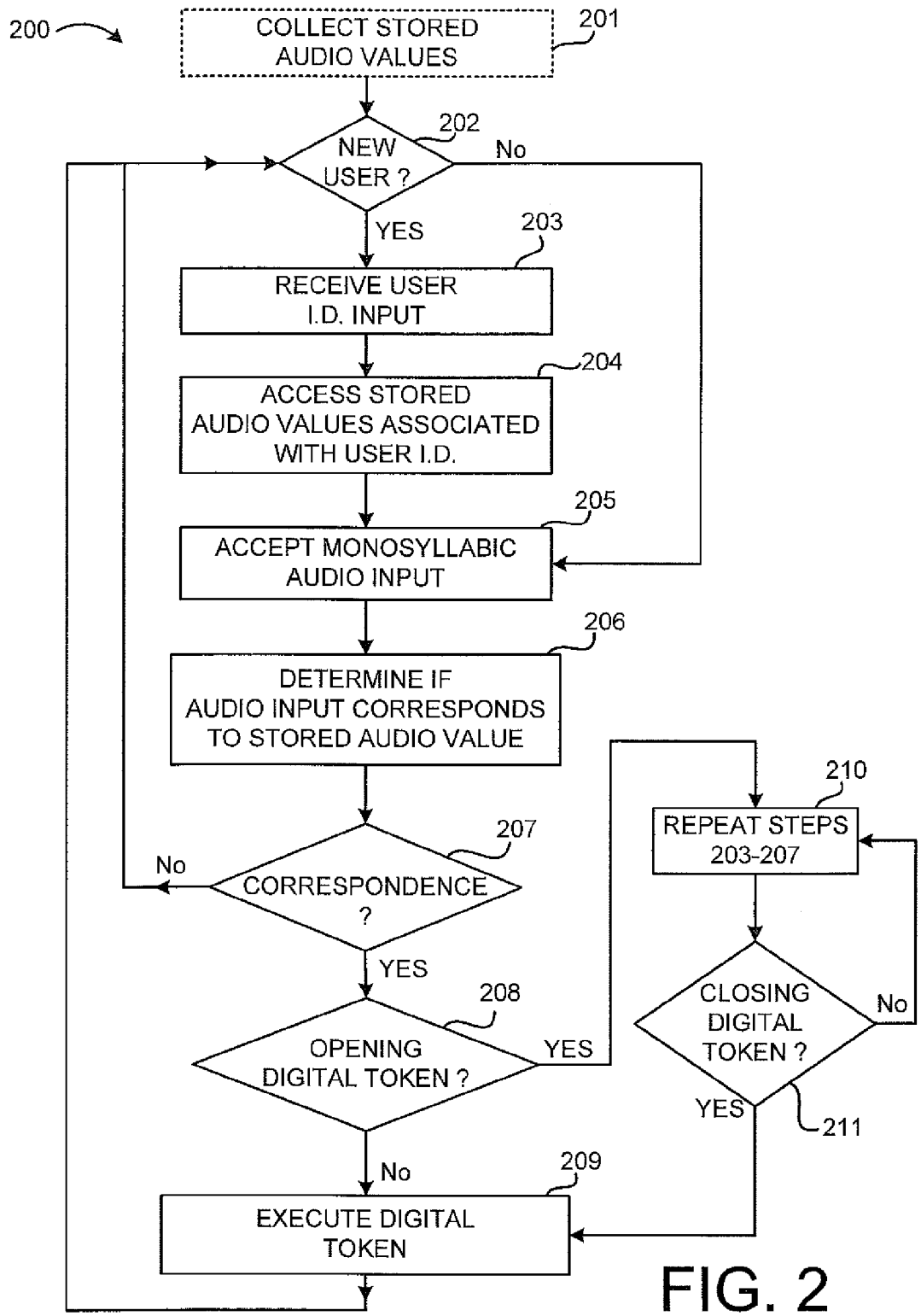
FIG. 2 is a logic flow chart showing the operation of the voice response system.

The following description and drawings are illustrative and are not to be construed as limiting. Various specific details are described to provide a thorough understanding. However, in certain instances, well known or conventional details are not described in order to avoid obscuring the description.

According to some embodiments, a voice recognition method and apparatus uses a custom language possessing a limited number of monosyllabic elements such as monosyllabic representations of letters, numbers and words, that in some cases, can reduce the amount of memory, processing, and training time required to run a voice recognition central processing unit (CPU). The monosyllabic representations may be based on the English language or any other language. Some embodiments of the voice recognition method and device are capable of reducing the required memory because the voice recognition device and method is not necessarily required to decipher amongst all multi-syllable letters, numbers or words in a given language. However, in other embodiments, the custom language can also consist of monosyllabic, disyllabic or polysyllabic representations of numbers, letters and words.

Embodiments of the voice recognition method and device can be implemented into various applications and devices at various stages and by various methods. For example, the voice recognition method and device can be implemented at the manufacturing stage, after the manufacturing stage, as a soft-ware ad-on or as a hard-ware retro-fit.

One utility of the custom language is that it has a limited number of monosyllabic representations are easy to remember, as in many cases they are reminiscent of their multi-syllable counterparts. For example, "com" can be the monosyllabic representation of the word "comma," or "dub" can be the monosyllabic representation of the letter "w."

Some embodiments of an apparatus or method for generating an output signal based on spoken user input can use the term "voice recognition apparatus" or "voice recognition method." The term voice recognition apparatus and/or method can generally describe any apparatus, configuration, program, or type of method or device that can be interacted with, manipulated or operated by the spoken input of a user.

The voice recognition method and voice recognition apparatus, in some embodiments for example, can be included in a computer chip, CPU, microprocessor or computer code that is implemented in any number of settings. For example, the voice recognition apparatus and method can be implemented in a portable telecommunication device such as a cellular phone to perform various functions including text messaging. A portable device is any device that is capable of being carried or moved by a person and can include hand held devices.

According to some embodiments, systems and methods are adaptable to be implemented in portable devices such as hand held devices. Some embodiments of the voice recognition apparatus and method can be desirable for portable devices because of the reduced memory, processing and battery requirements compared with more complex voice recognition systems and the inherent limitations associated with a portable device such as limited battery life, size limitations, and cost limitations.

According to some embodiments, systems and methods are adaptable to any number of exemplary applications and settings including but not limited to texting, cellular phone applications, navigational systems such as global positioning system applications (GPS), personal digital assistants (PDA), retrieving or saving data in memory, interacting with a central processing unit (CPU), exercising equipment, entertainment system applications including but not limited to televisions, remote controls, digital file players, speakers, or computer assisted applications, vehicle applications, radio, home and office appliances, performing calculations, telecommunication applications, data processing applications, computer network applications and any other application or setting now known or later discovered that the system and method for voice recognition disclosed herein can be adapted to.

FIG. 1 shows a schematic diagram of a table of audio patterns and digital tokens 100 used in some embodiments of the voice recognition apparatus and voice recognition method. Table 100 can be any reference table, library or stored information that provides a set of data elements for reference in encoding or decoding data. Data elements can include, for example numbers, text, binary code, frequency representations, time representations, computer program elements, pointers, references to other look-up tables, functions, and other data or data strings associated with information used in some systems and methods. Table 100 can be a look up table that is used to store and access audio patterns collected from a particular user.

Table 100 can accept a digital representation of audio input from a user and compare it with a series of stored audio patterns. In some embodiments, the comparison will check for the highest degree of correlation between the audio input and each of the stored audio patterns in table 100. In other embodiments, the comparison is carried out using fuzzy logic principals or any other comparison technique. The table can then select the audio pattern with the highest degree of correlation to the audio input and forward the audio pattern along with any other data associated with the audio pattern to a control device in order to perform a function according to a digital token 107 associated with the audio pattern. In some embodiments, table 100 can be configured to select an audio pattern if the degree of correlation is below a specified threshold. The comparison between stored patterns and audio input from a user can be performed by a variety of methods discussed in more detail below with respect to FIG. 2 and FIG. 4.

In some embodiments, table 100 can include data associations with each audio input 102. For example, each audio pattern can have associated data to indicate a particular user associated with the audio input 104, whether the audio pattern will initiate a specified function, sub-routine or command 105 or end a specified function, sub-routine or command 106, or a digital token 107 used to determine a control signal associated with each audio value or pattern 102.

For example, if the audio pattern associated with "A" is matched with an audio input from user 1, the associated digital token in 107 will be selected to send an output signal that can display, transmit, or communicate the letter "A" In another example, the audio pattern associated with "text," is associated with an opening command 105 and a closing command 106. The opening command field 105 can be used to indicate the initialization of a process such as collecting custom language elements as the contents of a text message. Closing command field 106 can be used to indicate the end of the process of collecting custom language elements and the transmission of a text message. As shown in FIG. 1, some audio patterns can be both an opening and closing command.

For instance, when table 100 matches the audio pattern representing "text" in 101a with an audio input, table 100 looks up field 105 and finds "text" has an opening command field associated with it. Field 105 can be used to select between various commands stored in the digital token portion 107 of table 100.

For instance, the first time "text" is selected, field 105 can indicate the initialization of an opening command and also indicate selection of one of a plurality of digital tokens 107 associated with an opening command 105. A digital token 107 can command output control 408 in FIG. 4 to communicate the word "ready" on a cell phone display and initialize accepting input for a text message. The second time table 100 matches the audio input "text," table 100 can recognize the audio pattern as a closing command 106. This recognition can cause table 100 to select the digital tokens 107 associated with a closing command to cause a control signal to cease accepting input for the text message and to transmit a completed message.

In some embodiments, each of the data elements in 101a are stored audio patterns corresponding to a particular user's sound waves or utterance of each element of a predetermined monosyllabic custom language. The audio values or patterns 102 can be digital representations in the time or frequency domain of a sound wave emitted from a particular user and received by the voice recognition apparatus and stored in memory. Each audio pattern 102 is entered into table 100 at step 201 in FIG. 2 using process 300 in FIG. 3. The digital representations of the sound wave can be calculated by a processor prior to being stored in table 100 as will be described in further detail in FIG. 3 and FIG. 4.

The table can be oriented such that the representations of utterances from several different users 104 are stored in the table. For example, the audio patterns stored in table 100 from user 1 are stored in table subset 101a, the audio patterns from user 2 are stored in table subset 101b, and the audio patterns from user 8 are stored in table subset 101c. Organizing the audio patterns according to user further simplifies memory and processing requirements. This is due in part to table field 104, which limits the list of audio pattern candidates that must be searched through to find the audio pattern that corresponds to spoken user input. As a result, under this embodiment, the voice recognition processor need not employ robust voice processing algorithms to distinguish between users based on vocal characteristics.

Referring back to table 100, for depiction purposes, data elements A, B, C, W, 7, text and find are only a subset of data elements that are included in stored audio pattern set 101*a*. For example, data element set 101*a* can include the entire set of predetermined custom language monosyllabic elements for a particular user in a given device such as a PDA or GPS unit.

In some exemplary embodiments, the custom language includes monosyllabic representations of the entire alphabet A-Z, numbers 0-9, and a limited set of monosyllabic commands that can be pertinent to the particular device the voice recognition apparatus and method is implemented in. The number of monosyllabic elements can, for example be 10, 15, 61, 100, or 500 or more elements. Although the data elements that make up data element set 101*a* correspond to a custom language, many of the elements of the custom language can be monosyllabic numbers, letters and words rather than monosyllabic representations of numbers, letters and words.

In one exemplary embodiment, there is a common custom language for portable devices such as cell phones, PDA's GPS units, remote controls, etc. wherein each custom language element is monosyllabic and each monosyllabic representation of a word, letter, or number is easy to remember for the user by truncating a multi-syllable word, letter or number to a single syllable representation or replacing a multi-syllable word with a single syllable element that is reminiscent of or associated with it's multi-syllable counterpart.

For example, the custom language element representing the word "period" can be "point." The custom language for portable devices can comprise, the monosyllabic representations of letters A-Z, monosyllabic representations of numbers 0-9, and a limited number of easy to remember single syllable words or commands such as learn, space (equivalent of space bar), name (to look up by first name), last (to look up by last name), phone (place a call), first (to look up by first name), text (to begin or send a text message), yes, no, reep (to repeat a display or output), send (to transmit), back, store (to save in memory), end (to end a call), out, new, mark (question mark), point (period), corn (comma), print, math (to pull up a calculator), add, less (subtract), times (multiply), find (general search function or GPS command), map, and over (divide). The "space" command for example, can be used as a language distinction element operable to distinguish discrete components of communication. In one exemplary embodiment, the "space" command could be used to distinguish between words or discrete components of communication in a text message. For instance a user can utter, "U" "space" "G" "O" "I" "N" "G" "space" "O" "U" "T" "mark," to Each of the commands are exemplary only and are not meant to be limiting. According to some embodiments, any number of various intuitive or easy to remember commands can be associated with various single syllable custom language elements.

In another exemplary embodiment, different types of devices can have different sets of monosyllabic custom languages. For example, if the voice recognition apparatus and method is implemented in a portable device such as a cell phone, the monosyllabic commands can include "text" to transmit a text message, "store" for saving contact information, "last" to look up a last name stored in memory, "first" to look up a first name stored in memory, "mark" for typing a question mark, "point" for typing a period, "space" for typing a space between characters or words and "com" for typing a comma. The custom language can have an entirely different set of single syllable words or commands depending on the type of device or system it is implemented in. For example, in the case of implementing the voice recognition device and method in a home appliance, for example, such words or commands can be unnecessary and can be replaced or supplemented by commands or words such as "temp" for temperature in the context of a thermostat or "close" for a garage door.

In the case of monosyllabic representations of numbers and letters for example, the custom language truncates multiple syllable letters into single syllable representations of a given letter. One of the utilities of the custom language is to condense the sound wave to be interpreted by the voice recognition apparatus into short time slices for ease of processing. According to some embodiments, each custom language element contains only a single syllable.

Because speech is a continuous flow of overlapping and interacting patterns, the boundaries between successive meaningful units of speech frequently overlap as received by a computer are unclear. There are no consistent separable units of information in a spoken word or phrase unlike printed letters or words separated by empty spaces. Accordingly, to recognize phonemes, the most basic unit of recognizable sound, or syllables or words, complex algorithms and processing is required to attempt to recognize, predict, distinguish and interpret which basic units of sound should be separated and which should be joined in order to form a meaningful communication. In some embodiments the custom language has consistent and predictable units of separation between each custom language element to facilitate efficient processing.

Longer words or multi-syllable numbers and letters are truncated to an easy to remember single syllable, so it is helpful to analyze the custom language from the viewpoint of a phonetic pronunciation. The phonetic pronunciation of each custom language element 103 is depicted in FIG. 1 to indicate the sound of the pronunciation associated with each custom language element stored as an audio pattern 102. For example, the letter "w", has the phonetic pronunciation "duhb-uh1-yoo" and has three syllables. However, under the custom language, the letter w would be represented by the pronunciation "duhb." Similarly, for example, the letter 7 has the phonetic spelling "sev-uh n" and has two syllables. Under the custom language, the letter 7 would be represented by the pronunciation "sev." Accordingly, if a first user, user 1, vocalizes the pronunciation "duhb," a voice recognition processor can create a digital version of the user's sound wave based on features of the user's sound wave in either the time domain or the frequency domain and store it as an audio pattern 102 in FIG. 1 in table location 101*a*. This method can be repeated for a second user in location 101*b* and so on for any number of users.

Figure 3:
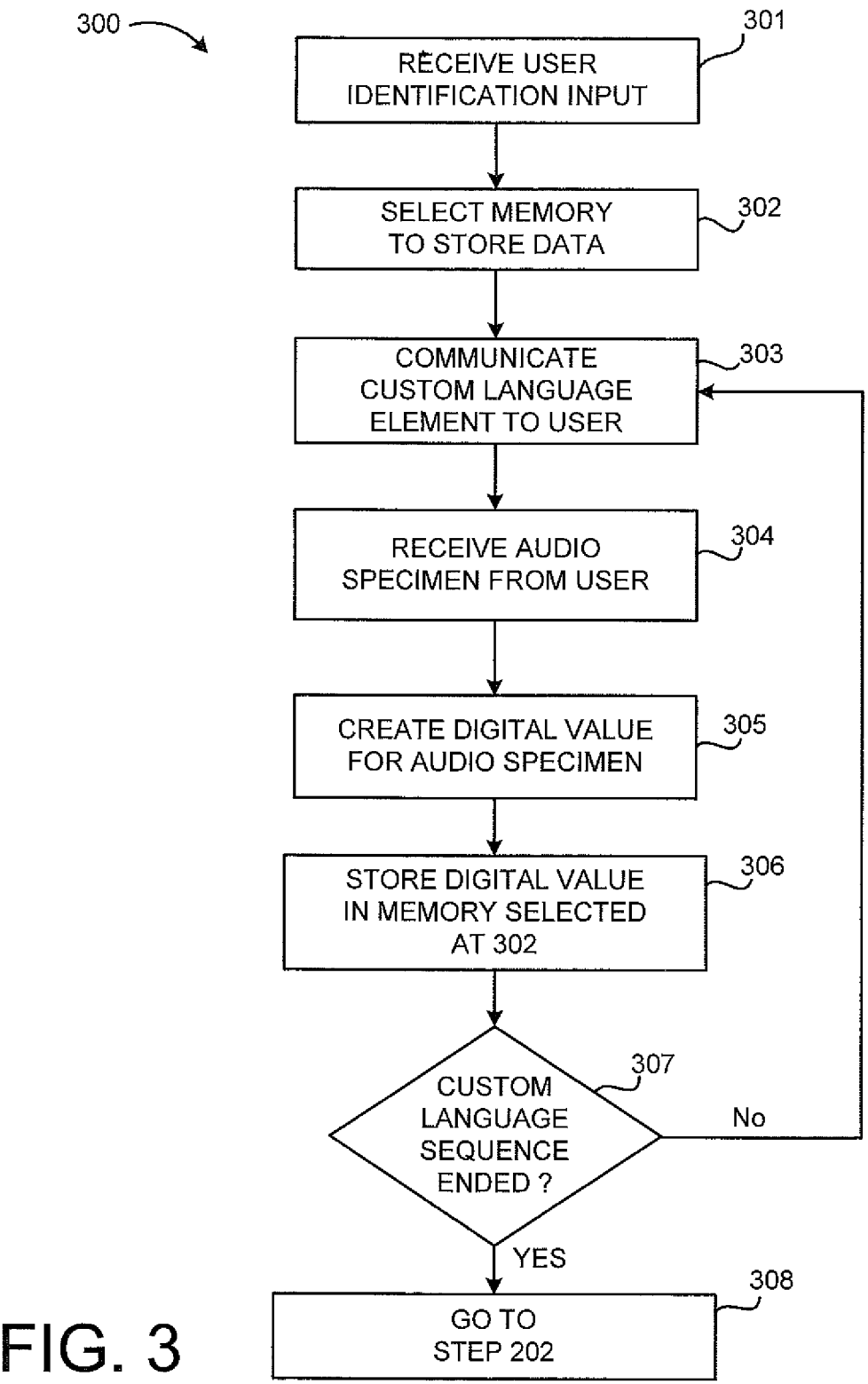
FIG. 3 is a logic flow chart showing the operation of collecting the stored audio patterns.
Figure 4:
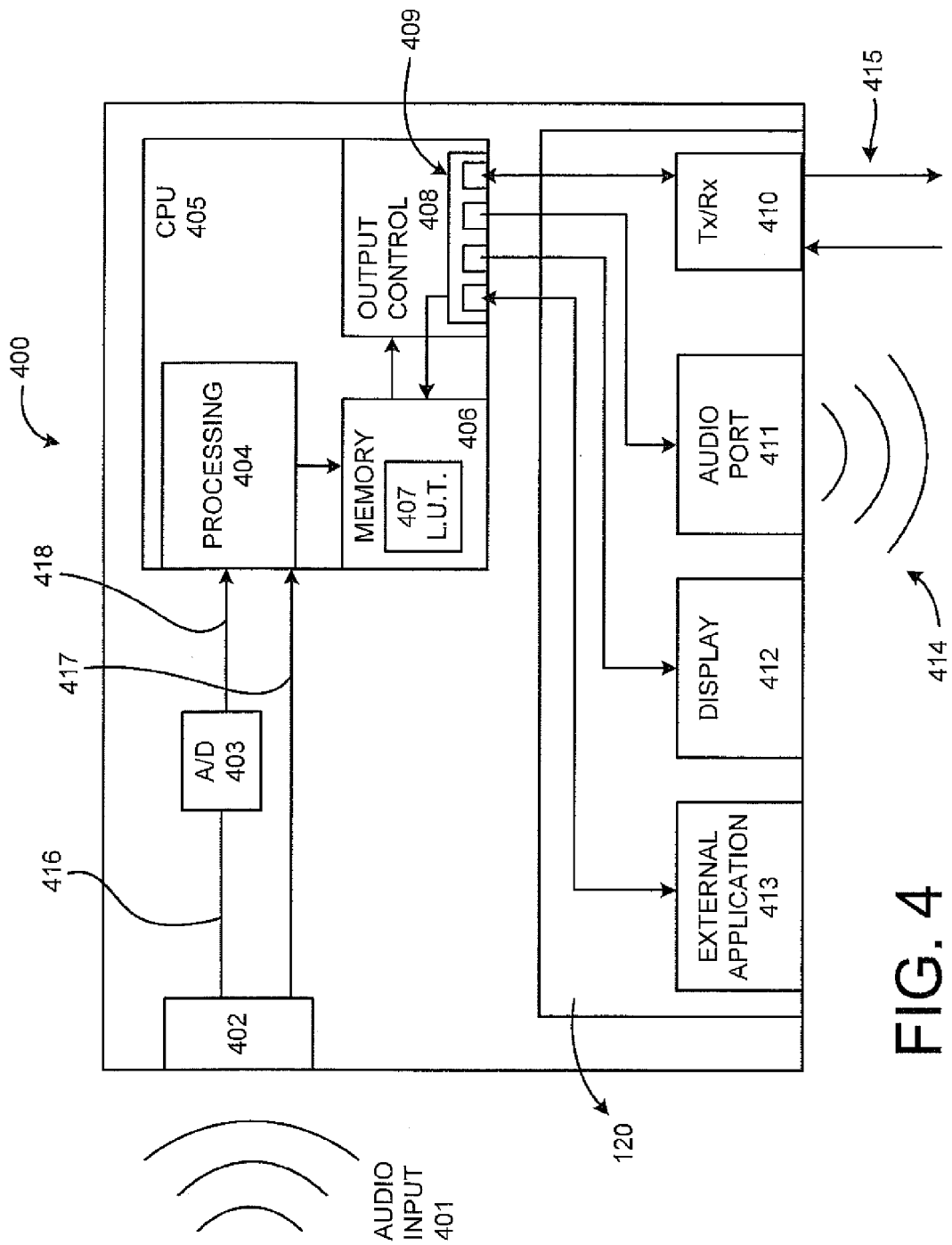
FIG. 4 is a block diagram of a voice response apparatus for generating a digital output signal.

FIG. 2 is a logic flow chart depicting the operation of one embodiment of the voice response method for the voice response apparatus depicted in FIG. 4. The flow charts described herein do not necessarily imply a fixed order to the actions and embodiments can be performed in any order that is practicable. Step 201 of FIG. 2, the process of collecting stored audio patterns, is shown in more detail as process 300 in FIG. 3. Process 300 is used to create the set of stored audio patterns for a given user such as 101*a*, 101*b* and 101*c* as shown in FIG. 1.

Process 300 begins with a user identifying themselves at step 301. A user can be identified through any input, such as pressing a button on a voice recognition device 400 or by vocalizing an identity recognized by the voice recognition device 400. For instance, a user can speak the monosyllabic custom language elements "U" and "1" with a slight pause between the elements to indicate the identity of user 1. Once user 1 vocalizes this identification input 401 as a sound wave, it is received at an input port 402. Input port 402, for example can be a microphone or other acoustic-electric transducer that accepts the audio input sound waves 401 and translates the sound wave into an electrical signal 416.

Electrical signal 416 contains the identification input that is then sent to CPU 405. The identification information can then be used in look up table 100, 407 to organize stored audio patterns according to user 104 at step 302, and to output control 408 to initiate a process of communicating the entire set of custom language elements stored in memory 406 to a user, at step 303. The monosyllabic custom language elements can be communicated to a user through either an audio output port 411, image display 412 or by other suitable means.

For each custom element communicated to a user, the user responds to each communication by uttering a monosyllabic audio input 401 corresponding to the communicated element before receiving the next communicated element. For each custom language element, for instance, A-Z, 0-9 and 25 command words, an audio specimen 401 is received at input port 402 which creates a continuous converted electrical signal 416. Signal 416 is then sampled at analog to digital converter 403 at a predetermined sampling rate to create a digitized discrete time signal 418. The higher the sampling rate used the more accurate the discrete representation of continuous time signal 416 will be.

In some embodiments, the sampling rate can be greater than twice the bandwidth of the input signal in order to be able to reconstruct the original perfectly from the sampled version. In some embodiments, each of the discrete audio input signals 418 can be segmented into windows or slices of time. The bounds of the window can be determined using various signal thresholding techniques. For example, processor 404 or other suitable component can detect when the signal amplitude of signal 418 falls below one or more predetermined thresholds such as a zero-crossing or other threshold. Because audio inputs according to some embodiments are single syllable, these time windows can consistently be between ⅛ of a second and ½ of a second, for example. Using time thresholds to discard audio input with amplitude above a specified threshold for longer than a specified period of time, such as ½ or ⅔ of a second can enable processor 404 to distinguish relevant custom language elements from irrelevant conversation occurring in the vicinity of the voice recognition device 400. Any other known method for isolating utterances from audio signals can similarly be applied.

Because various embodiments are only required to decode speech of predictable and limited time duration separated by slight pauses, such embodiments can offer maximum efficiency for processor 404. The limited duration audio input associated with each element of the monosyllabic custom language can simplify the calculations needed to decipher audio input by creating definite boundaries between each meaningful utterance that corresponds to a digital token 107.

The discrete time signal 418 can be thereafter converted into the frequency domain at step 305. For example, a discrete Fourier transform (DFT), fast Fourier transform (FFT), or other discrete mathematical transform such as a wavelet transform can be used to transform the discrete time signal into the frequency domain. Representing the time signal in the frequency domain can facilitate a more efficient and accurate comparison of the distinguishing vocal characteristics in common between an audio input signal 416 and stored audio patterns 102 than does a time domain signal comparison.

Once the discrete signal 418 has been transformed to the frequency domain, it can be manipulated or calculated in various ways in processor 404 to facilitate an accurate comparison of audio input 416 and stored audio patterns 102. In some embodiments the stored audio patterns can be represented in the time-frequency domain as a spectrogram, which contains data of the spectral density of a signal varied with time.

In some embodiments, spectral density can be calculated squaring the magnitude of the frequency domain signal. Processor 404 can be a digital signal processor where various signal conditioning can take place. Processor 404 can filter out noise that exists outside of the fundamental frequency range of the human voice, between about 40-600 Hertz. The frequency domain representation of the audio patterns to be stored in location 102 of table 100 can further be conditioned at processor 404 through logarithmic calculations, moving average filtration, re-sampling, statistical modeling, or various other types of signal conditioning.

Once the audio specimen 401 has been converted into the desired format at processor 404, the audio specimen is stored in memory 404 or look up table 407 also depicted in FIG. 1 as table 100 as an audio pattern 102 at step 306 for each custom language element. The stored audio patterns can be stored in table 100 in either the time domain as a digital signal 418, analog signal from input 417 or can be stored in the frequency domain, after being subjected to a time to a frequency domain transform in processor 404.

The user identification information received at step 301 can be associated with audio input 102 in order to create an efficient look up mechanism for table 100. For example, if user 1 enters identification information, the collected audio patterns 102 will be associated with U1 as shown by 101a in FIG. 1. If user 2 enters identification information, the collected patterns will be associated with U2 as shown by 101b, etc. Referring back to FIG. 3, step 307 indicates that according to some embodiments, the process of collecting stored audio patterns in steps 303-306 can continue until all of the monosyllabic elements in the monosyllabic custom language have been communicated to the user and an audio input is received for each monosyllabic custom language element.

According to some systems and methods, the sequence 300 of collecting stored audio patterns only needs to happen one time per user. Because the limited set of monosyllabic custom language elements can be configurable to only have 61 elements according to some embodiments, with less than one second needed for a user to pronounce each monosyllabic element, the collection process per user could be completed in around one minute.

Once the audio pattern collection process 300 has collected all the audio specimens 401 for a given user and stored them as audio patterns 102 in table 100 identified by a user, the general process of the voice recognition method continues in FIG. 2 at step 202. At step 202, if the given apparatus is on a default user 1 setting and user 1 would like to use the voice activated apparatus, user 1 can begin interacting with the apparatus by uttering monosyllabic audio input at step 205. However, according to some embodiments, if the apparatus is on a setting that differs from a prospective user, that user must enter user identification input at step 203, for example, by uttering "U" "8," to indicate that user 8 is going to be using the apparatus. Entering the user identification information allows the apparatus to access previously stored patterns 101c associated with user 8, at step 204 to affect an efficient look-up process.

According to some embodiments, once the correct set of audio patterns 102 has been accessed according to user information 104, the voice recognition device is ready to accept monosyllabic audio input at step 205. At step 205, a user will utter one of the monosyllabic custom language elements as audio input 401. The audio input is received at input port 402.

Input port 402, for example can be a microphone or other acoustic-electric transducer that accepts the audio input sound waves 401 and translates the sound wave into an electrical signal 416 or 417.

The process for receiving monosyllabic audio input at step 205 can be performed in the same manner as the process for receiving an audio specimen for a user at step 304 in FIG. 3 as discussed above. It is desirable for these two processes to be the same or similar because an audio specimen, which becomes on of the stored audio values or patterns 102, is compared with the monosyllabic audio inputs at step 206 in FIG. 2 in look up table 100.

Accordingly, in some embodiments, the patterns associated with both the audio input signal and stored audio pattern should be in the same format. According to some embodiments, both the monosyllabic audio input and the stored audio patterns are frequency domain spectral density data. However any suitable format for signal comparison purposes can be used.

According to one embodiment, determining a correspondence at step 206 involves, comparing a frequency domain representation of the audio input signal from step 205 against each of the frequency domain representations of the stored audio patterns or values for a particular user, such as the stored audio patterns for user 1 in 101a. Because each discrete monosyllabic custom language element has a unique frequency domain representation, the audio input signal with the highest degree of correspondence can be selected at step 207. Correspondence may be found according to correlation, fuzzy logic or any other comparison technique.

Alternatively, according to some embodiments, step 207 can only find a correspondence if the degree of correspondence between an audio input pattern and a stored audio pattern is above a certain threshold of correspondence. Under this embodiment, if the specified level of correspondence is not met by the audio input signal, no match is found and the process begins again at step 202 with no output signal being produced, as seen in FIG. 2. For example, depending on the correlation threshold selected, if a user other than the current user selected speaks into the device, no matches will result because of differences in the frequency pattern of the user's voice, for instance.

More specifically, if two frequency domain signals are compared, for example, the spectral densities of the two signals can be cross-correlated. Cross-correlation compares the energy densities of two frequency domain signals and determines a level of similarity between the two frequency signatures by computing a correlation pattern, for example, between 0 and 1. A 0 correlation result means there is no correlation and 1 means a perfect correlation. Correlation between the spectral densities of the audio input signal and each of the stored audio patterns for a particular user, such as 101a, 101b, or 101c, can be calculated using any method known in the art.

Correlation can be determined by calculating a scalar product or normalized scalar product of the frequency representations of the audio input signal and the stored audio pattern. To perform the cross-correlation independent of the amplitude of each signal, a normalized cross-correlation calculation can be performed. The process of spectral cross correlation is advantageous in monosyllabic custom language and user specific voice recognition system in that the matching pool that must be looked up for each audio input is limited in number and have consistent time windows.

In the case that the stored pattern 102 for a particular user with the highest correlation pattern is higher than a predetermined threshold of correspondence, table 100 selects the highest correlated audio pattern. Table 100 is then used to look for various other data fields associated with that stored audio pattern at steps 208 and 209. In step 208, table 100 is used to determine if the stored audio pattern is associated with initiating a particular subroutine or "opening command" and whether it is associated with ending a particular subroutine or "closing command." For example, the audio pattern associated with "text," can be associated with an opening command 105 and an opening digital token 107.

An opening digital token 107 can be used to create a control signal initializing a process such as collecting custom language elements as the contents of a text message. This is indicated by step 210, wherein steps 203-207 are repeated in order to accept content for a text message. According to this example, once a user has entered the desired text message content, the user can utter an audio input 401 associated with a closing digital token.

According toe some embodiments, once a closing digital token is selected at step 211, collection of text message content will cease and output control 408 will be directed by digital token 107 to transmit the text message at step 209 by executing the digital token. As shown in FIG. 1, in columns 105 and 106, some audio patterns can be both an opening and closing command. For instance, receiving "text" a first time can constitute an opening command according to some embodiments, while receiving text while an opening command is in operation can constitute a closing command.

Figure 5:
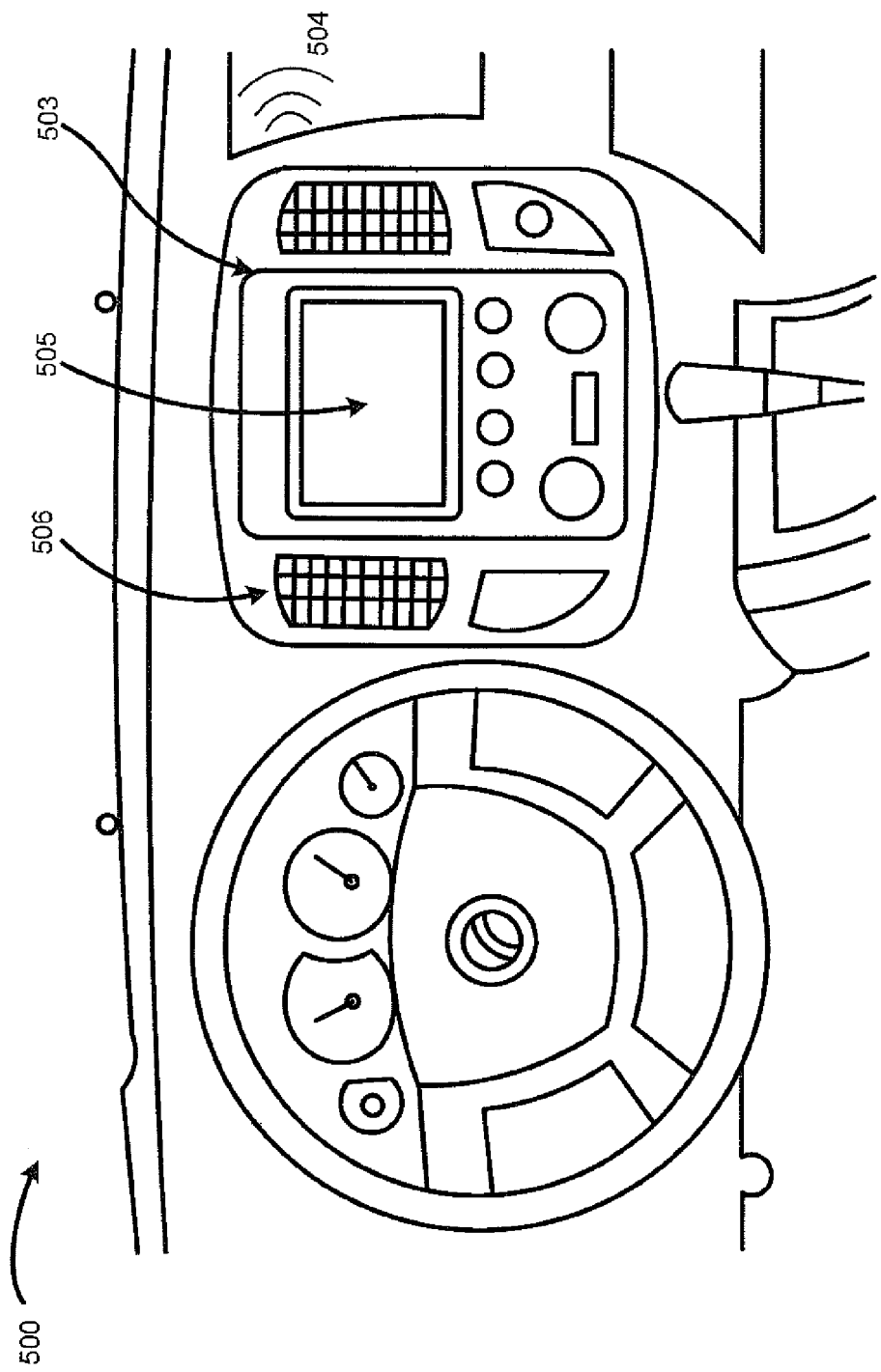
FIG. 5 is a perspective diagram of an exemplary system according to some embodiments.
Figure 6:
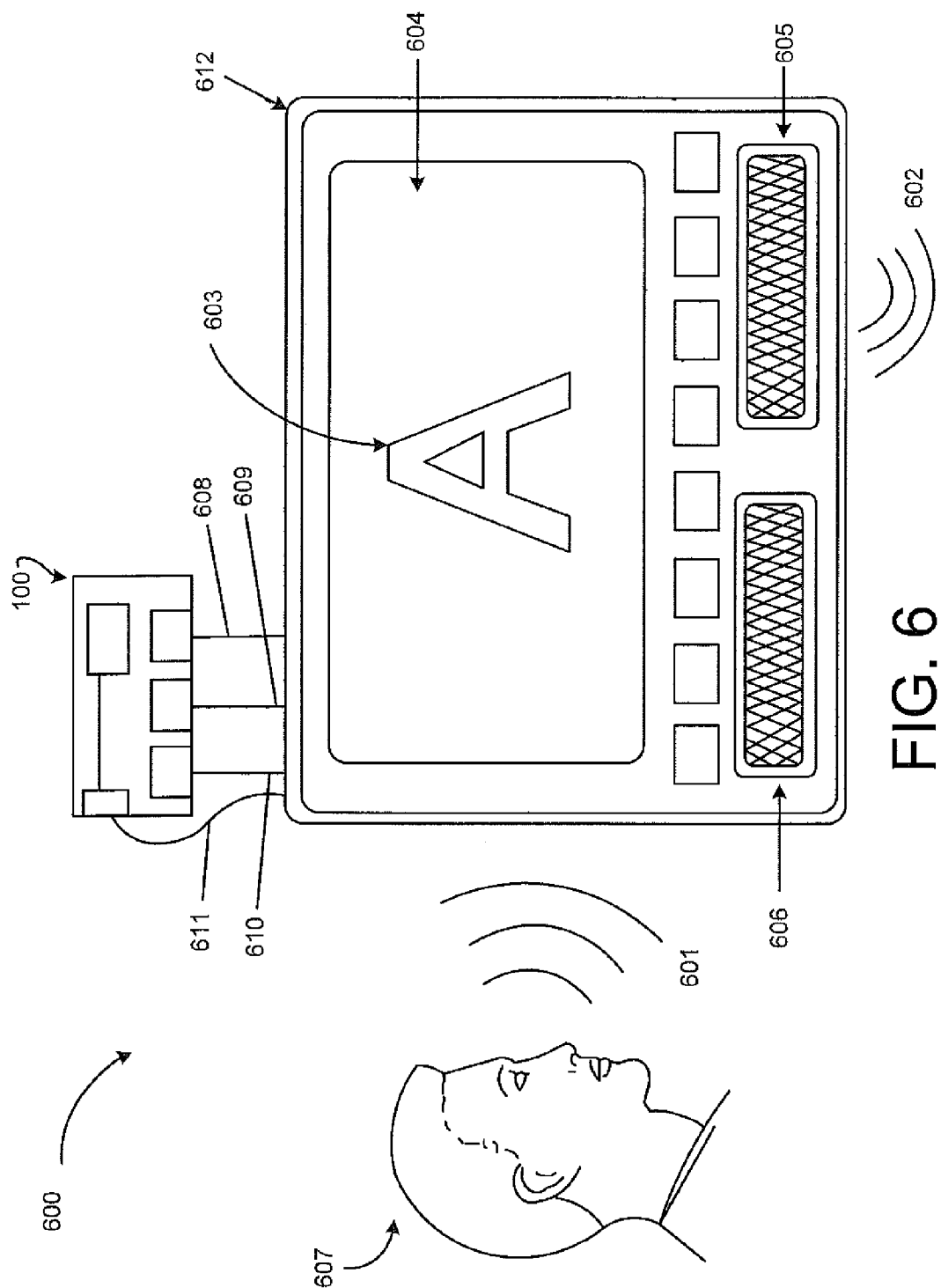
FIG. 6 is a perspective diagram of an embodiment of the voice response apparatus and method incorporated into a hand-held device.

FIG. 4 is a block diagram of a voice response device 400 for generating a digital output signal according to some embodiments. The block diagram of FIG. 4 can be implemented in a variety of applications and settings including the applications depicted in FIG. 5, a vehicle, FIG. 6, a hand held device such as a GPS unit, FIG. 7, a remote control, entertainment system and lighting system, FIG. 8, a processing system and a computer network, and FIG. 9, a portable telecommunications system such as a cellular phone.

With respect to FIG. 4, audio input 401 can be a sound wave uttered by a user such as users 501, 607, 711, 803 and 905 in FIGS. 5-9. Audio input 401 is received at an input port 402. Input port 402, for example can be a microphone or other acoustic-electric transducer that accepts the audio input sound waves 401 and translates the sound wave into an electrical signal 416 or 417. Signals 416 and 417 are continuous time signals. The continuous time signal can be sampled at analog to digital converter 403 and converted into a discrete time signal 418 which is sent to CPU processor 404. Alternatively, processor 404 can accept a continuous time signal 417. Processor 404 can be a digital signal processor for carrying out mathematical calculations such as Fourier transforms, performing filtering functions, or various other signal conditioning operations on signals 417 or 418.

After sufficient processing at 404, the processed and digitized audio input signal is sent to memory 406, which can for example, contain a look up table 407 depicted in FIG. 1. In FIG. 1, the audio patterns 102 correspond to one or several digital tokens 107. When an audio pattern is selected by a comparison process previously discussed, an associated digital token is also selected. This digital token is then sent to output control 408 to send data to one of several output ports 410, 411, 412 and 413. Output port 410 can be a transmitter, used for example, to transmit text messages in the application shown in FIG. 9.

Figure 8:
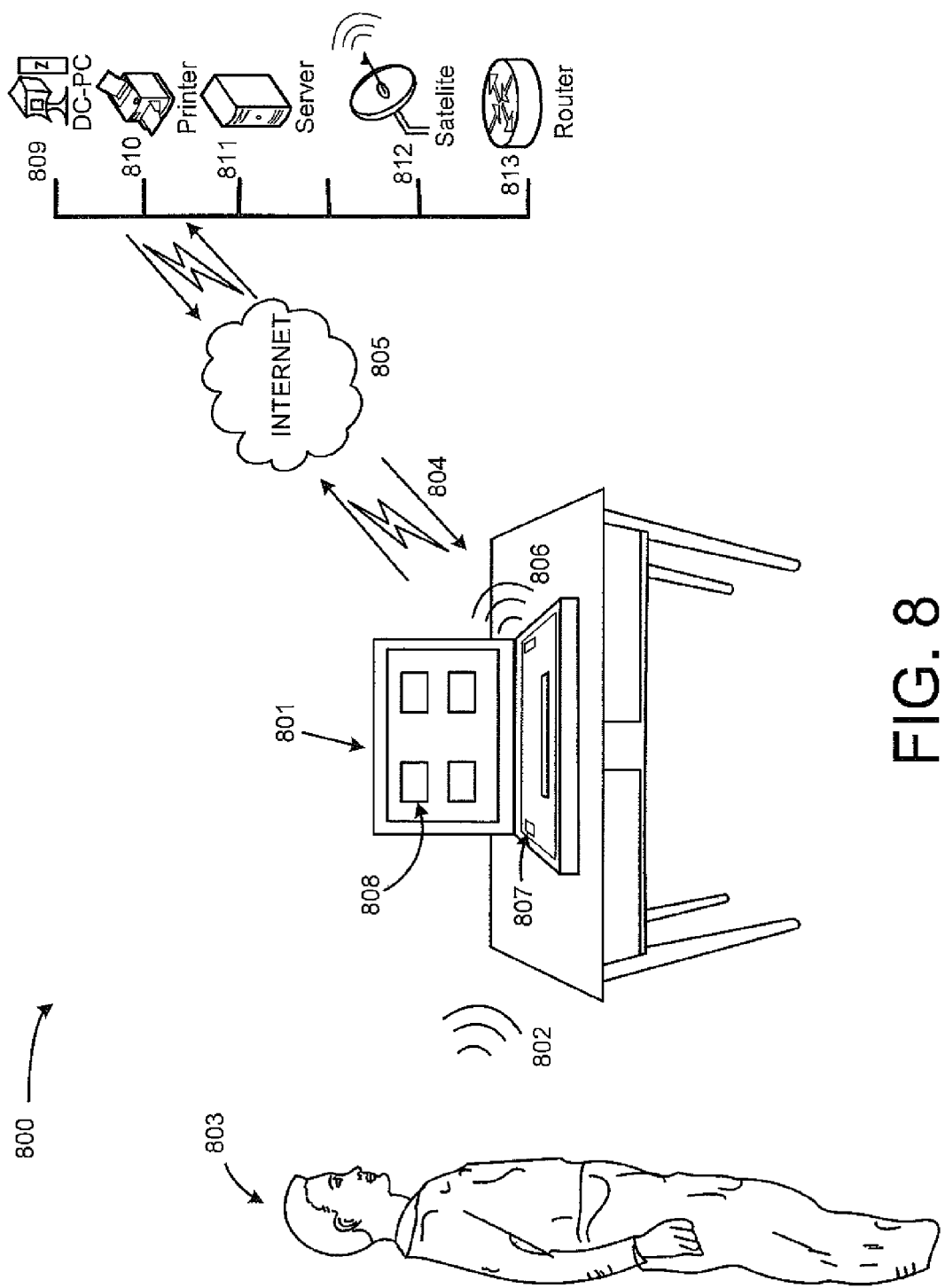
FIG. 8 is a perspective diagram of a processing system and a computer network incorporating an embodiment of the voice response apparatus and method.
Figure 9:
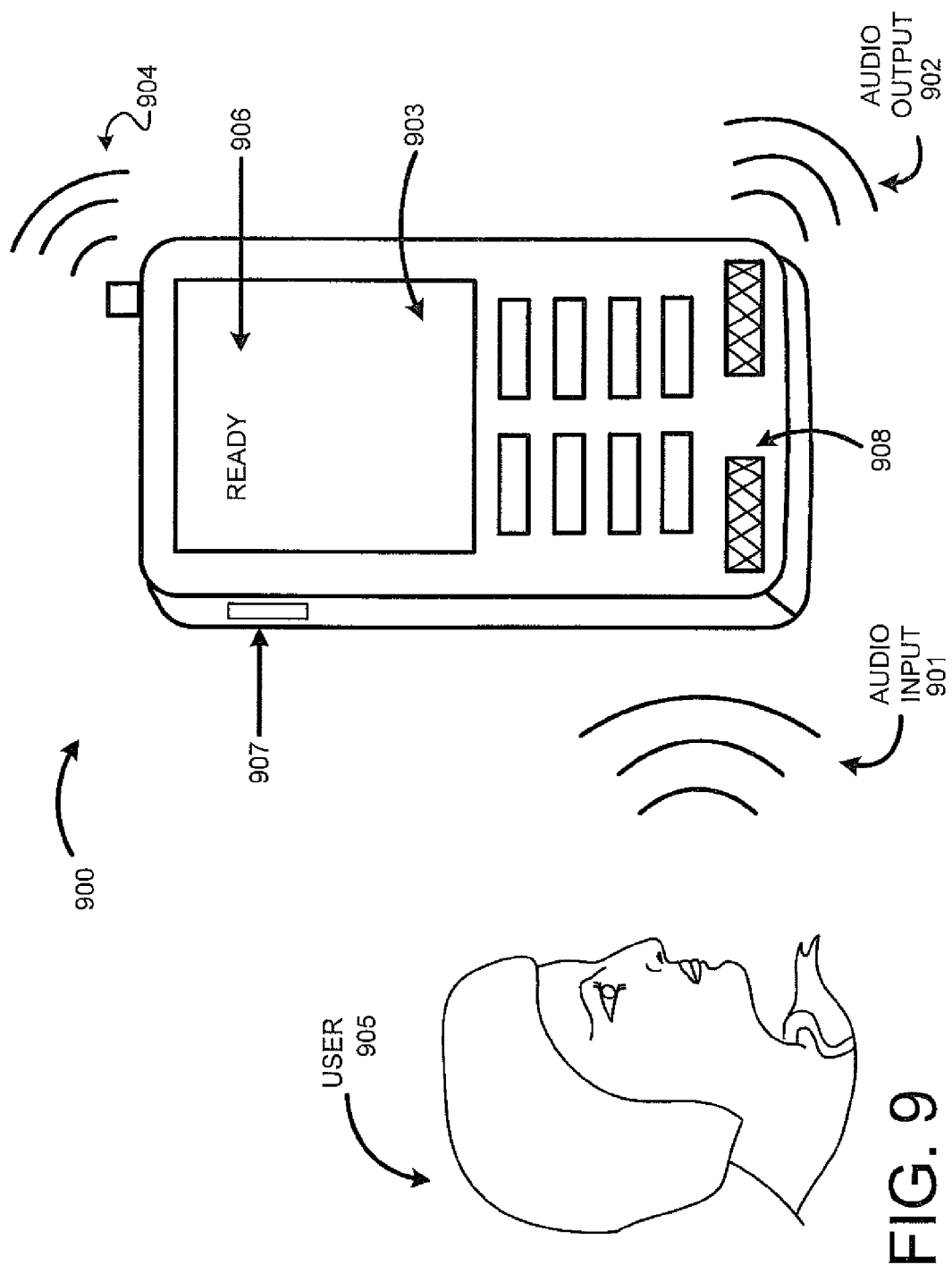
FIG. 9 is a perspective diagram of a portable telecommunications system incorporating an embodiment of the voice response apparatus and method.

According to some embodiments, output port 410 can correspond to an antenna from which a transmission signal 904 emits in FIG. 9. Output port 410 can additionally include a receiver to receive information that can be communicated to CPU 405. Output control 410 can also send an output signal to audio port 411, which in some embodiments include a speaker. However, audio port 411 may be any suitable component capable of emitting sounds that can be understood by a user. A speaker is shown in FIG. 9 emitting audio output 902, in FIG. 8 emitting output 806, in FIG. 7 as component 713, in FIG. 6 as element 605, and FIG. 5 as output 504. One use for audio port 411 in these various applications is in the process of collecting stored audio patterns 300. At step 303, the audio port can be used to communicate a custom language to a user by pronouncing the monosyllabic custom language element to prompt the user to send an audio input 401 to audio input port 402 corresponding to the monosyllabic custom language element.

Output port 412 can be used to display information to a user or to otherwise communicate data for a user's convenience. For example, in FIG. 6, signal 610 is sent from output port 412 to communicate a monosyllabic custom language element to a user, for example, the letter "A" 603, to prompt the user to send an audio specimen 401 to the audio input port 402 corresponding to the monosyllabic custom language element. Displays 604, 808, 903, 505 can all also be used display audio input recognized by voice recognition device 400. The display may be any type of display capable of conveying information visually to a user. A display in the application of FIG. 9 can display the contents of each letter of a text message after a user enters audio input 401 so the user can view the message being created. In the case of telecommunication system 900, in using the "find" command, display 903 can display the message "ready" 906 to communicate to the user it is ready to accept letters for looking up a contact stored in telecommunication system 900.

In response, user can say, "last" to indicate the user will be spelling letters associated with a last name stored in memory 406 in a contacts list. Again, display 903 can then display the message "ready" to communicate to the user it is ready to accept letters. For example, the user can then utter "D" "O" "L" with a slight pause between each utterance after which device 900 can display a name on display 906 or announce a name through the audio output port 411 corresponding to the stated letters. In other embodiments a user may interact with the voice recognition apparatus by spelling out a series of monosyllabic custom language elements. According to some embodiments the user can speak the "space" custom language element which will be recognized by the voice recognition apparatus to insert a space between the various spelled letters.

Output port 413 can be used for any other type of device specific output needed. For example, port 413 can be a connection to a light source 712 as shown in FIG. 7 or any other device specific output desired.

Figure 7:
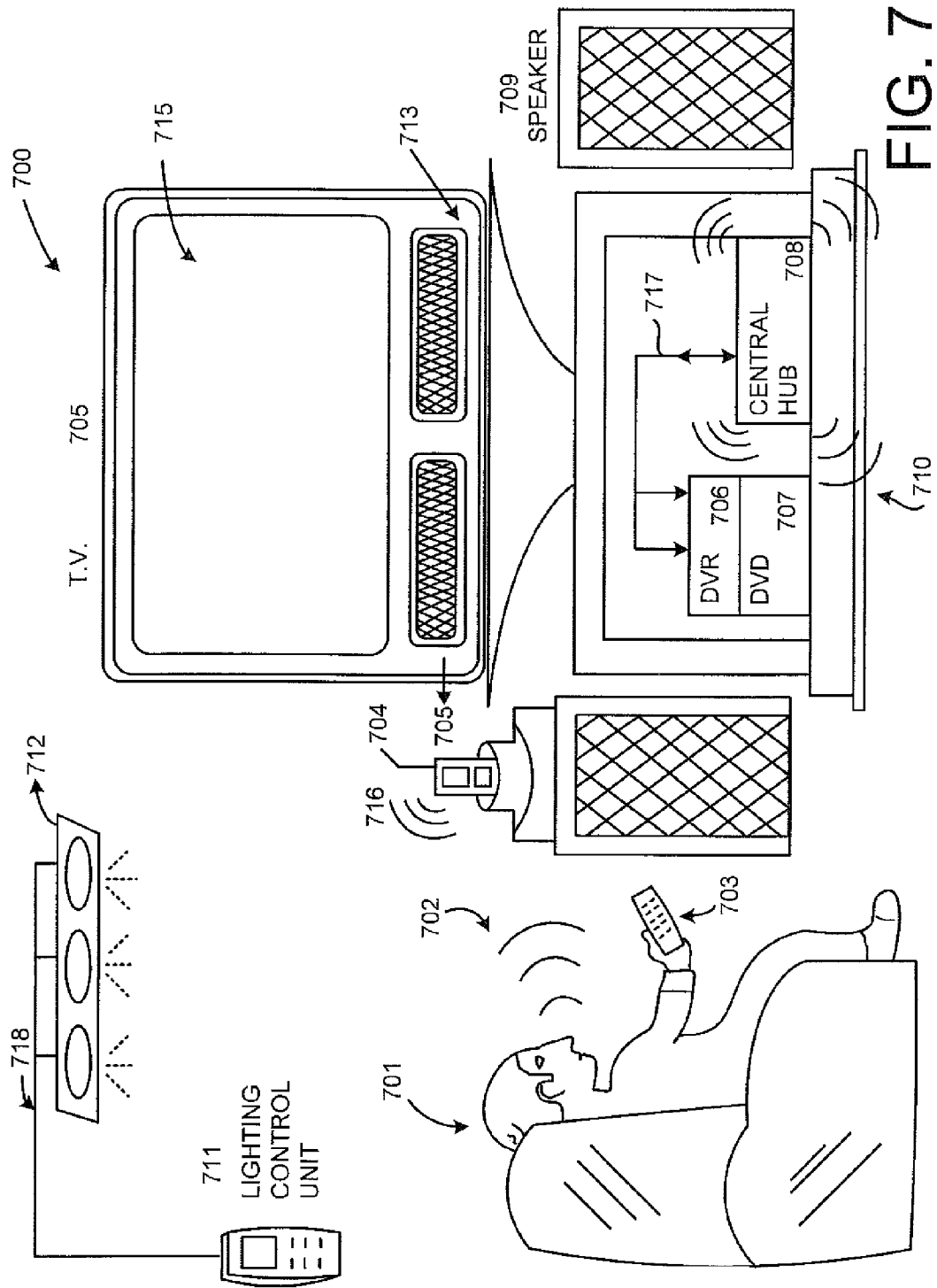
FIG. 7 is perspective diagram incorporating an embodiment of the voice response apparatus and method in a remote control, entertainment system and lighting system.

Referring to FIG. 7, some embodiments of the voice recognition method and apparatus can be implemented such that spoken user input is used to interact with a single device such as a remote control 703, or is used to interact with various peripheral devices from a central hub 708. For example, the voice recognition method and device can be separately implemented into each of several peripheral devices such as a television 705, digital video recorder (DVR) 706, speaker system 709, digital music player 704 and lighting system 711. This embodiment can be desire able where it is impractical for a particular device to have its own speaker or display to communicate with the user. This centralized type of application can also be used in a vehicle 500 to communicate with various vehicle applications from a central location 503. The central hub can communicate with the remote control 703, television 705, DVR 706, speaker system 709, digital music player 704 and lighting system 711 wirelessly through signals 710.

This same process can be used to communicate over a network as shown in FIG. 8. Voice recognition device 400 can be implemented into processing system 801. According to some embodiments, user 803 can interact over the Internet with various devices such as a personal computer 809, printer 810, server 811, satellite 812 or router 813.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A computer-implemented method for generating an output signal based on spoken user input, comprising:
   storing, in a memory:
      a plurality of audio patterns generated by the user, each audio pattern including a single monosyllabic representation of a command, number, letter or word having two or more syllables in a custom language wherein at least one audio pattern represents both an opening command and a closing command; and
      a plurality of digital tokens each associated with at least one stored audio pattern;
   receiving, from a user, at least one audio input from the custom language;
   selecting, using a processor, one of the plurality of stored audio patterns associated with the user, in the case that the audio input received from the user corresponds with one of the plurality of stored audio patterns;
   determining, using the processor, the digital token associated with the selected one of the plurality of stored audio patterns; and
   generating, using the processor, an output signal configured to communicate the command, number, letter or word based on the determined digital token.

2. The method of claim 1, wherein each of the plurality of stored audio patterns is associated with one distinct monosyllabic audio input.

3. The method of claim 1, further comprises:
   identifying a user based on user identification input; and
   accessing the plurality of stored audio patterns associated with a user based on the user identification input.

4. The method of claim 3, wherein identifying the user further comprises:
   identifying the user based on monosyllabic audio input.

5. The method of claim 1, further comprising:
   collecting the plurality of stored audio patterns from the user by:
      prompting the user to utter a monosyllabic audio specimen;
      receiving the uttered monosyllabic audio specimen;
      converting the uttered monosyllabic audio specimen into a digital pattern; and
      storing the digital pattern of the uttered monosyllabic audio specimen as the stored audio pattern.

6. The method of claim 3, wherein the stored audio patterns and digital tokens are stored in a table and one of the plurality of stored audio patterns in the table is selected by:
   comparing a digital audio input signal with each stored audio pattern associated with the identified user; and
   selecting one of the plurality of stored audio patterns with the highest correspondence to the digital audio input.

7. The method of claim 6, wherein comparing the digital audio input signal with each stored audio pattern associated with the identified user is performed by calculating a correlation between the digital audio input signal and the stored audio pattern.

8. The method of claim 1, wherein the custom language includes a language distinction element operable to generate an output signal for the purpose of distinguishing discrete components of communication.

9. The method of claim 5, wherein the process of collecting the plurality of stored audio patterns requires only one collection sequence per user in order to generate an output signal based on spoken user input.

10. The method of claim 9, wherein prompting the user to utter a monosyllabic audio specimen comprises sending data representing a monosyllabic custom language element from an output control circuit to at least one of an audio and visual output port.

11. The method of claim 1, wherein the plurality of stored audio patterns are frequency domain representations of the spoken user input.

12. The method of claim 6, wherein:
a processor is operable to convert a discrete time signal representing audio input and a discrete time signal representing an audio specimen to the frequency domain to create a frequency domain representation of the audio input and a frequency domain representation of the audio specimen; and
determining the highest correspondence between the stored audio pattern and the digital audio input comprises calculating a correlation between the frequency domain representation of the digital audio input and each of the plurality of frequency domain representations of the stored audio patterns.

13. The method of claim 2, wherein the output signal is generated in a central hub and is distributed to one or more peripheral devices operably connected to the central hub.

14. The method of claim 6, wherein the table compares the stored audio patterns associated with the user with digital audio input signals if the digital audio input signals contain audio input under a predetermined time slice duration threshold; and
the table does not compare the digital audio input signals with stored audio patterns if the audio input in a digital audio input signal is above a predetermined time slice duration threshold.

15. A portable voice recognition apparatus for generating an output signal based on spoken user input comprising:
an acoustic-electric transducer configured to receive monosyllabic audio input and output an electrical audio input signal;
an analog to digital converter operably connected to the acoustic-electric transducer configured to take the electrical audio input signal and output a discrete electrical audio input signal;
memory including:
a plurality of stored audio patterns generated by the user, each audio pattern including a single monosyllabic representation of a command, number, letter or word having two or more syllables in a custom language wherein at least one audio pattern represents both an opening command and a closing command; and
a plurality of digital tokens each associated with at least one stored audio pattern;
at least one processor operably connected to the at least one memory wherein the processor is configured to:
receive the electrical audio input signal;
determine the stored audio pattern associated with the electrical audio input signal;
determine the digital token associated with the selected one of the plurality of stored audio patterns; and
generate an output signal configured to communicate the command, number, letter or word based on the determined digital token;
at least one output control circuit; and
at least one output port operably connected to the at least one output control circuit.

16. The portable voice recognition apparatus of claim 15, wherein each of the plurality of stored audio patterns is associated with one distinct monosyllabic audio input.

17. The portable voice recognition apparatus of claim 15, further comprising:
a threshold determining component operably connected to the memory to determine if the discrete audio input signal contains audio input under a predetermined time slice duration.

18. A portable voice recognition apparatus for generating an output signal based on spoken user input comprising:
memory including custom language entries made up of custom language elements wherein each element includes a single monosyllabic representation of a command, number, letter or word having two or more syllables wherein at least one custom language element represents both an opening command and a closing command;
at least one of an audio port and visual display means to communicate to a user the entire set of custom language elements stored in memory;
an acoustic-electric transducer to convert each uttered monosyllabic audio specimen received from the user into a continuous electrical signal;
an analog to digital converter to convert each continuous electrical signal into a discrete electrical signal;
a processor for conditioning each discrete electrical signal; and
a look up table, stored in the memory, for storing each conditioned discrete electrical signal as a stored audio pattern.

19. The portable voice recognition apparatus of claim 18, wherein each of the stored audio patterns is associated with one distinct monosyllabic audio input.

20. The method of claim 3, wherein the stored audio patterns and digital tokens are stored in a table and one of the plurality of stored audio patterns in the table are selected by:
comparing a digital audio input signal with each stored audio pattern associated with the identified user; and
selecting one of the plurality of stored audio patterns above a specified threshold of correspondence with the highest correspondence to the digital audio input.

\* \* \* \* \*